United States Patent
Argentino

(10) Patent No.: US 9,863,483 B2
(45) Date of Patent: Jan. 9, 2018

(54) MECHANICAL COUPLING GROUP

(71) Applicant: ANNOVI REVERBERI S.P.A., Modena (MO) (IT)

(72) Inventor: Pierluigi Argentino, Anzola Dell'Emilia (IT)

(73) Assignee: ANNOVI REVERBERI S.P.A., Modena (IT)

( * ) Notice: Subject to any disclaimer, the term of this patent is extended or adjusted under 35 U.S.C. 154(b) by 0 days.

(21) Appl. No.: 15/254,277

(22) Filed: Sep. 1, 2016

(65) Prior Publication Data

US 2017/0070117 A1    Mar. 9, 2017

(30) Foreign Application Priority Data

Sep. 7, 2015 (IT) .......... 102015000048982

(51) Int. Cl.
| | |
|---|---|
| *F16D 3/84* | (2006.01) |
| *F04B 17/03* | (2006.01) |
| *F04B 17/05* | (2006.01) |
| *F04D 13/02* | (2006.01) |
| *H02K 5/00* | (2006.01) |

(52) U.S. Cl.
CPC .......... *F16D 3/843* (2013.01); *F04B 17/03* (2013.01); *F04B 17/05* (2013.01); *F04D 13/021* (2013.01); *H02K 5/00* (2013.01)

(58) Field of Classification Search
CPC .......... F02B 63/06; F04B 17/03; F04B 17/05; F04D 13/021; F16B 9/029; F16D 3/843; H02K 5/00; H02K 7/14; Y10T 403/645
USPC .................. 464/170, 177; 403/337
See application file for complete search history.

(56) References Cited

U.S. PATENT DOCUMENTS

| | | | |
|---|---|---|---|
| 4,073,606 A | 2/1978 | Eller | |
| 4,198,832 A * | 4/1980 | Pauli | F16D 3/185 464/154 |
| 4,909,545 A | 3/1990 | Hohol | |
| 5,045,026 A * | 9/1991 | Buse | F04D 13/024 417/360 |
| 6,129,529 A * | 10/2000 | Young | F04D 9/001 417/423.14 |
| 6,398,521 B1 * | 6/2002 | Yorulmazoglu | F04D 13/021 403/298 |

(Continued)

OTHER PUBLICATIONS

European Search Report in corresponding application EP 16183703, dated Dec. 2, 2016.

*Primary Examiner* — Josh Skroupa
(74) *Attorney, Agent, or Firm* — Volpe and Koenig, P.C.

(57) ABSTRACT

A mechanical coupling group of two devices, includes coupling body having a hollow cylindrical central portion and a first flange destined to couple with a first device, and a second flange destined to couple with a second device, threaded means being provided with a broadened head for fixing each of the two flanges to the respective device, in which the second flange comprises at least three first equidistant recesses located on a circumference thereof, and having a larger diameter than a diameter of the broadened head, a cylindrical tract branching from each recess having a diameter that is identical to a diameter of the circumference on which the threaded means lie, less one half of the diameter thereof, and a second recess facing towards the first recess and having a smaller diameter than the broadened head of the threaded means.

5 Claims, 1 Drawing Sheet

(56) References Cited

U.S. PATENT DOCUMENTS

| | | | | |
|---|---|---|---|---|
| 7,284,963 B1 * | 10/2007 | Houle | .................... | F04D 13/06 |
| | | | | 417/423.9 |
| 7,329,065 B2 * | 2/2008 | Hu | ......................... | F16D 1/033 |
| | | | | 366/331 |
| 9,664,199 B2 * | 5/2017 | Ripattila | ............... | F04D 29/042 |
| 2006/0099028 A1 | 5/2006 | Hu et al. | | |
| 2007/0003406 A1 | 1/2007 | Racer et al. | | |

* cited by examiner

MECHANICAL COUPLING GROUP

FIELD OF THE INVENTION

The present invention relates to a mechanical coupling of two devices, of which one provided with a drive shaft and the other provided with a driven shaft.

In particular, the invention relates to a mechanical coupling of a motor, generally electric, internal combustion or the like, and a pump.

BACKGROUND

The kinematic coupling of two devices of the above type is generally realised by using an intermediate coupling body between the two devices, in which the ends of the drive shaft and the driven shaft are positioned.

The end of the drive shaft is generally provided with grooved means, able to insert in complementary grooved means in the hollow end of the driven shaft.

In the present description the grooved means comprise both the usual axial grooves and the complementary grooves destined to accommodate a key.

The coupling body is first fixed to one of the two devices, generally the one provided with the driven shaft.

In the case of the motor-pump coupling, it is the pump that is provided with the driven shaft.

The coupling of this type of device, in particular the pump with the respective actuating motor, is done in the prior art with the aid of a coupling body which enables stably coupling the actuating drive shaft of the pump with the shaft of the motor.

The coupling body, which also functions as a spacer, is a hollow body provided at ends thereof with two flanges, of which one is destined to fix the hollow body to the pump body, and the other is destined to fix the hollow body to the motor body.

The coupling body is first fixed to the pump body, and then the pump body together with the coupling body is fixed to the motor body.

The flange destined to couple with the surface of the motor body, from which the drive shaft exits, has at least three holes for receiving fixing bolts, destined to be place in correspondence with a same number of threaded holes present in the motor body.

Suitable bolts are inserted in the holes of the flange and screwed into the corresponding holes of the motor body.

The bolt must be locked with an appropriate torque so as to guarantee the stability of the coupling.

The document U.S. Pat. No. 4,073,606 discloses a mechanical coupling group respectively provided with a drive shaft and a driven shaft, constituted by a coupling body having a hollow cylindrical central portion able to contain coupled ends of the two shafts, and two end flanges of which a first flange destined to couple with the body of the device provided with the driven shaft (13), and a second flange destined to couple with the body of the device provided with the drive shaft, threaded means being provided with a broadened head for fixing each of the two flanges to the body of the respective device.

The known constructions are not without drawbacks.

It is necessary to realise the precise positioning of the coupling body, already fixed to the pump, on the surface of the motor; substantially it is necessary to place the holes of the flange of the coupling body exactly corresponding to the threaded holes present in the motor body.

This is generally obtained by the use of assembly templates.

Once the positioning has been done, the bolts have to be introduced into the holes of the flange of the coupling body and then the bolts are completely screwed and locked in the holes of the motor body.

The operation is laborious as once the bolts are inserted in the holes of the motor body, the complete screwing and blocking thereof is not possible using normal screwing means, due to dimension-related questions.

This implies a considerable amount of time and labour for the operator.

The aim of the present invention is to remedy the drawbacks of the known constructions.

SUMMARY

The aim is attained by using a coupling group having the characteristics recited in the independent claim.

The dependent claims relate to further characteristics of the invention aimed at improving performance.

The device of the present invention comprises, as mentioned, a hollow body, generally tubular in shape, which is provided at the ends thereof with a first and a second flange.

The first flange has at least three, generally four, holes which are destined to be positioned corresponding with a same number of holes present in the pump body.

The axial dimension of the hollow body is such as to accommodate the ends, reciprocally coupled, of the driven shaft and the drive shaft.

Generally the end of the drive shaft is grooved, and inserts in the grooved cavity located at the end of the driven shaft.

Alternatively the end of the shaft of the motor and the end of the hollow driven shaft comprise two complementary seatings able to house a key.

The screwing and tightening of the fixing bolts of the first flange to the pump body is carried out using normal screwing means, the use of which is not prevented by the presence of the motor, still not fixed to the coupling body.

The surface of the motor body destined to couple to the second flange of the coupling body has at least three, generally four, equidistant threaded holes, the axes of which are located on a circumference that is coaxial to the axis of the hollow body, i.e. coaxial with the shaft of the motor and with the shaft of the pump.

Each of the holes is destined to receive a fixing bolt of the second flange, provided with a broadened head, preferably provided with an incorporated washer.

Each bolt is destined to be partially screwed into the respective hole of the body of the device provided with a drive shaft up to leaving, between the washer and the body of the device, a distance that is just a little greater than the thickness of the second flange.

The second flange is peripherally provided with first recesses, substantially semi-circular and facing towards the outside, located corresponding with the receiving holes of the bolts fashioned in the motor body.

The diameter of the first recesses of the second flange is a little greater than the diameter of the washer incorporated in the head of the respective bolts.

The edge of the second flange exhibits, by a side of each of the first recesses, a cylindrical portion a radius of which is equal to the radius of the circumference on which threaded holes are located, reduced by a half of the diameter thereof.

At the end of each of the cylindrical portions the second flange exhibits a second recess facing towards the first recess and tangential to the cylindrical portion.

The diameter of the second recess is smaller than the diameter of the washer incorporated in the head of the respective bolts.

The ends of the first recesses from which the cylindrical portions of the second flange branch depends on the rotation direction of the shaft of the pump.

Supposing that the rotation direction of the pump shaft is anticlockwise seen from the end of the shaft, the cylindrical portions of the second flange will branch to the right of the first recesses, observing the hollow coupling body from the side of the pump.

BRIEF DESCRIPTION OF THE DRAWINGS

The advantages and constructional characteristics of the invention will more clearly emerge from the detailed description that follows which, with the aid of the appended tables of drawings, illustrates a preferred embodiment of the invention, provided by way of non-limiting example.

DETAILED DESCRIPTION OF THE PREFERRED EMBODIMENTS

Figure 1:
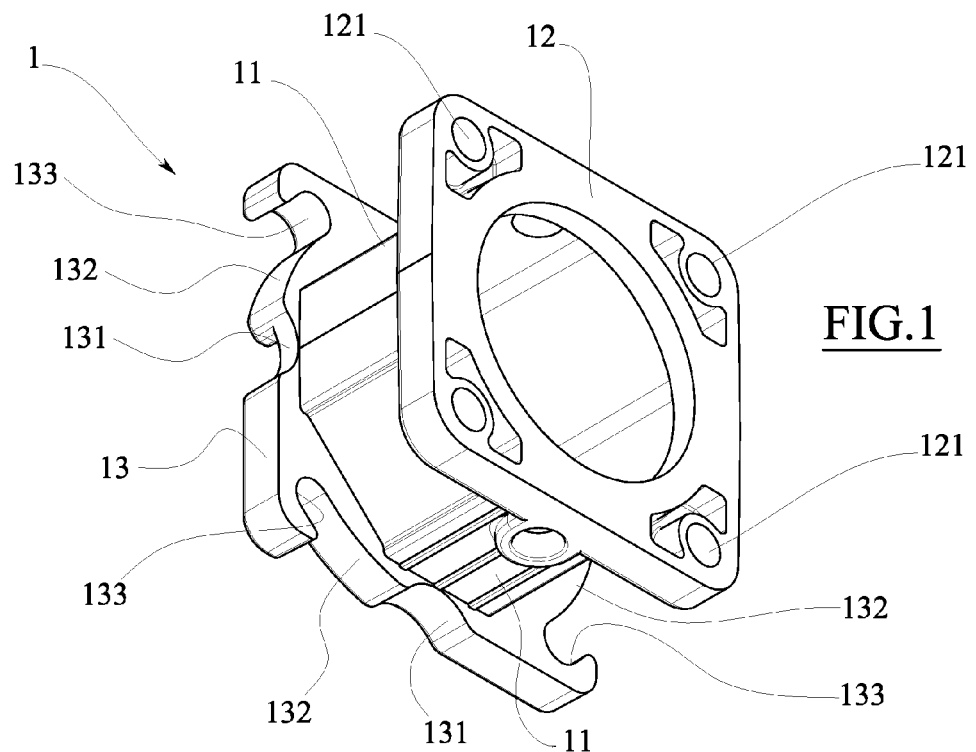
FIG. 1 illustrates the object of the invention in a perspective view.

The figures illustrate the coupling body 1 of a pump 2 to the respective actuating motor 3.

The coupling body 1 exhibits a central portion 11, cylindrical, hollow and having any section, provided with a first flange 12 and a second flange 13.

The first flange 12 has a square plan, and has four holes 121 located at corners thereof.

The second flange 13 also has a square plan, and has four first circular recesses 131 located substantially halfway along the sides.

A cylindrical portion 132 branches, in the same direction, from each of the first recesses 131, at the end of which a second recess 133 is located facing towards the first recess 131 from which the cylindrical portion 132 branches.

The side of the motor 3 to which the pump 2 is fixed has a flat surface 31 provided with four equidistant holes 32 located on a same circumference.

A bolt 33 is screwed into each of the holes 32 having a broadened head 331.

The diameter of the broadened head 331 is smaller than the diameter of the first recesses 131, but is greater than the diameter of the second recesses 133.

The drive shaft 4 is located at the centre of the four holes 32, which drive shaft 32 is provided with a keyed coupling 41 able to receive the joined coupling present on the driven shaft (not illustrated).

The functioning of the coupling body of the present invention is as follows.

First the body 1 is fixed to the body of the pump 2 by screwing the bolts 122 inserted into the holes 121 of the pump 2 body.

The bolts 33 are then screwed into the holes 32 present in the body of the motor, taking care to leave a distance between the broadened head 331 and the flat surface 31 of the body of the motor that is just a little greater than the thickness of the second flange 13.

At this point the shaft of the motor 4 and the driven shaft of the pump 2 are axially inserted, with the coupling body 1 already stably fixed to the body of the pump 2.

The insertion is made possible by the passage of the broadened heads 331 of the bolts 33 in the first recesses 131 of the second flange 13.

Figure 2:
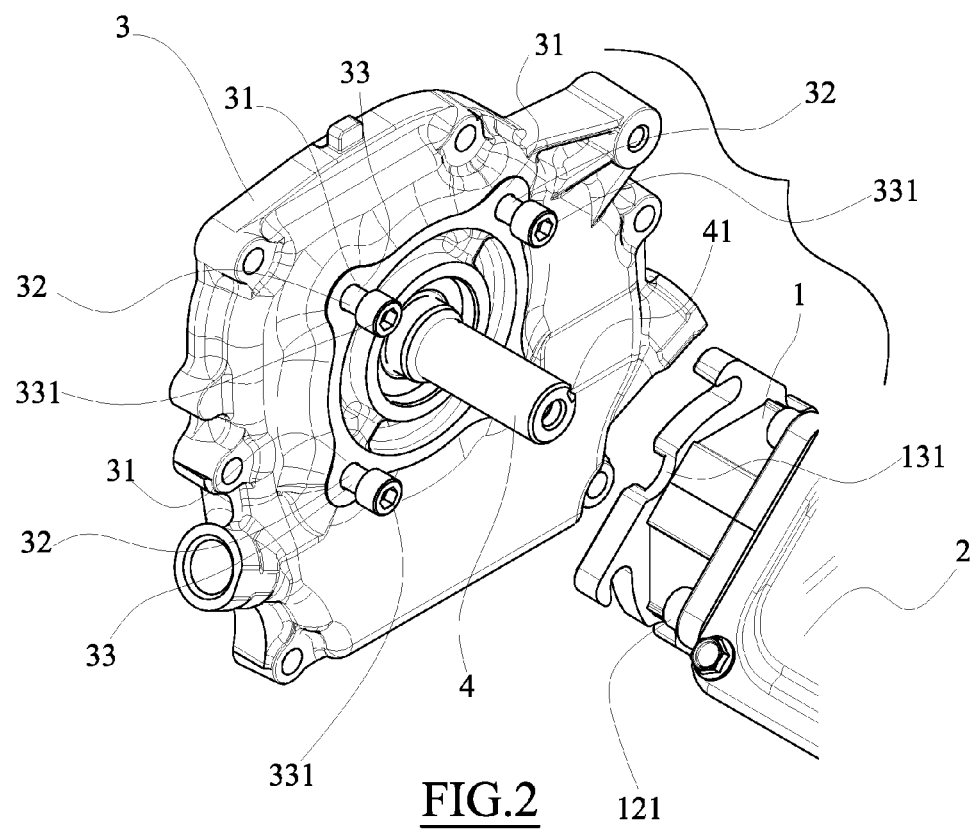
FIG. 2 illustrates the assembly diagram of the invention in a perspective view.

The body of the pump 2 and the coupling body 1, already fixed to the pump 2, are then rotated in anticlockwise direction (FIG. 2), and the stem of the bolts 33 then slides on the cylindrical portion 132 of the second flange 13 up to locating in the second recess 133 of the second flange 13.

In this position the broadened head 331 of the bolts 33 goes beyond the second flange 13, and a small blocking rotation of the bolts 33 stably fixes the pump 2 and the coupling body 1 to the body of the motor.

The aims of the invention are thus attained, as it is no longer necessary either to make the holes of the motor body coincide with the holes of the second flange 13 of the coupling body 1, or to perform a complete screwing rotation of the bolts which fix the second flange of the coupling body to the body of the motor.

The invention is understood not to be limited to the embodiment described above, and variants and improvements thereto can be made without forsaking the scope of protection of the claims that follow.

In particular the invention is applicable in all cases in which the mechanical coupling of two devices is to be obtained, of which one provided with a drive shaft and one provided with a driven shaft.

What is claimed is:

1. A mechanical coupling group of two devices, respectively provided with a drive shaft (4) and a driven shaft, constituted by a coupling body (1) having a hollow cylindrical central portion (11) able to contain coupled ends of the two shafts, and two end flanges (12, 13) of which a first flange (12) destined to couple with a body of the device provided with the driven shaft, and a second flange (13) destined to couple with a body provided with the drive shaft, threaded fixing means being provided with a broadened head for fixing each of the two flanges to the body of the respective device, wherein the second flange (13) coupling with the body of the device provided with the drive shaft comprises at least three first equidistant recesses (131) located on a circumference thereof, and having a larger diameter than a diameter of the broadened head of the threaded fixing means of the flange, a cylindrical tract (132) branching from each recess having a diameter that is identical to a diameter of the circumference on which the axes of the threaded means reduced by a half of the diameter thereof are located, which cylindrical portion terminates in a second recess (133) facing towards one of the first recesses and having a smaller diameter than the broadened head of the threaded fixing means.

2. The mechanical coupling group according to claim 1 wherein the first recesses present on the second flange are four in number.

3. The mechanical coupling group according to claim 1 wherein the device provided with the drive shaft is an electric motor.

4. The mechanical coupling group according to claim 1 wherein the device provided with the drive shaft is an internal combustion engine.

5. The mechanical coupling group according to claim 1 wherein the device provided with the driven shaft is a pump.

* * * * *